(12) United States Patent
Saggin

(10) Patent No.: US 9,781,942 B2
(45) Date of Patent: Oct. 10, 2017

(54) SHELF-STABLE MILK CONCENTRATES FOR PREPARING ACIDIFIED MILK BASED BEVERAGES

(71) Applicant: NESTEC S.A., Vevey (CH)

(72) Inventor: Raffaella Saggin, Montbrelloz (CH)

(73) Assignee: Nestec S.A., Vevey (CH)

( * ) Notice: Subject to any disclaimer, the term of this patent is extended or adjusted under 35 U.S.C. 154(b) by 115 days.

(21) Appl. No.: 14/734,637

(22) Filed: Jun. 9, 2015

(65) Prior Publication Data

US 2015/0264953 A1    Sep. 24, 2015

Related U.S. Application Data

(62) Division of application No. 12/302,574, filed as application No. PCT/EP2007/055735 on Jun. 12, 2007, now abandoned.

(30) Foreign Application Priority Data

Jun. 12, 2006  (EP) .................................... 06012031
Dec. 12, 2006  (EP) .................................... 06125864

(51) Int. Cl.

| | | |
|---|---|---|
| A23C 9/154 | (2006.01) | |
| A23C 9/156 | (2006.01) | |
| A23C 3/03 | (2006.01) | |
| A23L 2/385 | (2006.01) | |
| A23L 2/60 | (2006.01) | |
| A23L 2/66 | (2006.01) | |
| A23L 2/68 | (2006.01) | |
| A23L 29/219 | (2016.01) | |
| A23L 29/231 | (2016.01) | |
| A23L 29/238 | (2016.01) | |
| A23L 29/256 | (2016.01) | |

(52) U.S. Cl.
CPC .............. *A23C 9/1542* (2013.01); *A23C 3/03* (2013.01); *A23C 9/1565* (2013.01); *A23L 2/385* (2013.01); *A23L 2/60* (2013.01); *A23L 2/66* (2013.01); *A23L 2/68* (2013.01); *A23L 29/219* (2016.08); *A23L 29/231* (2016.08); *A23L 29/238* (2016.08); *A23L 29/256* (2016.08); *A23V 2002/00* (2013.01)

(58) Field of Classification Search
CPC ........................... A23C 9/1542; A23C 9/1565
USPC ....................................................... 426/590
See application file for complete search history.

(56) References Cited

U.S. PATENT DOCUMENTS

| | | | |
|---|---|---|---|
| 3,800,052 A | 3/1974 | Inagami et al. | |
| 3,966,390 A | 6/1976 | Nakano et al. | |
| 3,996,391 A | 12/1976 | Inagami et al. | |
| 4,031,264 A | 6/1977 | Arolski et al. | |
| 4,192,901 A * | 3/1980 | Yasumatsu ........... | A23C 9/1307 426/43 |
| 4,194,019 A | 3/1980 | Yasumatsu et al. | |
| 4,212,893 A | 7/1980 | Takahata | |
| 4,676,988 A | 6/1987 | Efstathiou et al. | |
| 5,766,666 A * | 6/1998 | Streiff .................... | A23C 9/005 426/519 |
| 6,171,633 B1 | 1/2001 | Dulebohn et al. | |
| 6,475,539 B1 * | 11/2002 | DeWille ................... | A23L 2/38 426/573 |
| 2003/0054079 A1 * | 3/2003 | Reaves .................... | A23C 1/12 426/511 |
| 2004/0071821 A1 | 4/2004 | Ashourian et al. | |
| 2006/0016343 A1 * | 1/2006 | Tobin ...................... | A47J 31/41 99/275 |
| 2010/0151081 A1 * | 6/2010 | Tams ................... | A23C 9/1216 426/43 |

FOREIGN PATENT DOCUMENTS

| | | |
|---|---|---|
| EP | 0385051 | 9/1990 |
| EP | 0491623 | 6/1992 |
| EP | 01206909 | 5/2002 |
| EP | 1224868 | 7/2002 |
| EP | 1250845 | 10/2002 |
| WO | WO 9629880 | 10/1996 |
| WO | WO 02058479 | 8/2002 |
| WO | WO 2005099468 | 10/2005 |

OTHER PUBLICATIONS

European Search Report from European Patent Application No. EP 1867234A1 dated Nov. 9, 2006.
International Search Report for International Application No. PCT/EP2007/055735 mailed Aug. 30, 2007.
Written Opinion for International Application No. PCT/EP2007/055735 mailed Aug. 30, 2007.

(Continued)

*Primary Examiner* — Jill Warden
*Assistant Examiner* — Bhaskar Mukhopadhyay
(74) *Attorney, Agent, or Firm* — K&L Gates LLP

(57) ABSTRACT

A shelf-stable liquid base composition useful for preparing acidified milk based beverages, e.g. by dilution with water in a beverage dispensing machine, comprises: from about 2 to about 10 weight % of denatured milk proteins expressed as solid-not-fat (SNF) milk components; from about 15 to about 80 weight %, expressed as sugar equivalents, of a carbohydrate based or non carbohydrate based sweetener; from about 0.35 to about 1.50 weight % of a carbohydrate based stabilizer; and an acidifying agent present in amounts necessary for achieving a pH of about 3.0 to about 3.8 of the said base composition. Methods for preparing such a base composition and also acidified milk based beverages prepared by means of such a base composition are disclosed.

19 Claims, No Drawings

(56) References Cited

OTHER PUBLICATIONS

N. Amice-Quemeneur, et al., "Influence of the acidification process on the colloidal stability of acidic milk drinks prepared from reconstituted nonfat dry milk," Dec. 1, 1995, Journal of Dairy Science, pp. 2683-2690.
G. Anema et al., "Rheological properties of acid gels prepared from heated Ph-adjusted skim milk," Journal of Agricultural and Food Chemistry, vol. 52, No. 2, Jan. 28, 2004, pp. 337-343.

* cited by examiner

SHELF-STABLE MILK CONCENTRATES FOR PREPARING ACIDIFIED MILK BASED BEVERAGES

CROSS-REFERENCE TO RELATED APPLICATIONS

The present application is a divisional application of U.S. application Ser. No. 12/302,574, filed Mar. 24, 2009, which is a U.S. national stage filing of International Application No. PCT/EP07/055735, filed Jun. 12, 2007, which claims priority to European Patent Application No. 06012031.8, filed Jun. 12, 2006, and European Patent Application No. 06125864.6, filed Dec. 12, 2006, the entire contents of which are incorporated herein by reference.

FIELD OF THE INVENTION

The present invention relates to beverages, more precisely to shelf-stable liquid base compositions useful for the preparation of acidified milk based beverages, especially by means of beverage dispensing machines.

BACKGROUND

Acidified milk beverages are very popular today as they offer simultaneously sweetness and freshness to consumers. These beverages further provide well known milk nutrients like proteins or minerals and, when acidity is achieved by means of fruits juices, the latter further bring flavours or vitamins in addition to the mere acidifying effect.

Most of the acidified milk based beverages are available today as "ready-to-drink" beverages, which require storage at refrigerated conditions and, consequently, which have a limited shelf life. Several attempts have been made in the past to increase stability and storage period of said "ready-to-drink" beverages, e.g. by controlling pH with suitable stabilizers, increasing sugar content or removal of undesired components like certain milk or juice electrolytes (see e.g. U.S. Pat. No. 4,676,988).

U.S. Pat. No. 3,800,052 discloses the preparation of a sour, "ready-to-drink" milk beverage having a good whiteness and stability made by adding acid to skim milk to bring the pH of the beverage within the range of 3.5 to 3.7. Acid is added to skim milk and water in predetermined proportions, then sugar and the whole is subject to moderate heating (around 70° C.), refined and flavoured if necessary and eventually bottled as is for storage or for direct consumption.

U.S. Pat. No. 4,194,019 describes a method for preparing an acidified milk beverage which has milk protein stably dispersed therein and which is "ready-to-drink" without dilution, when subjecting an acidified skimmed milk having a milk solid-not-fat (SNF) content of 0.5 to 3.5 weight % and a pH value of 3.0 to 3.9 to heat treatment at ultra-high temperature. Acidic pH is due to lactic fermentation and addition of sugar is optional.

U.S. Pat. No. 4,192,901 eventually discloses a method for manufacturing a concentrate defined as "milk-containing acid syrup" which is further used for preparing beverages by dilution with water. In this case, the inventors have addressed a specific issue, i.e. the stabilization of milk proteins by monitoring the casein I sugar ratio and subsequently subjecting the acidified milk-sugar mixture to ultra-high temperature heating: inventors have assumed that during said ultra-high temperature heat treatment, casein undergoes some form of reaction with sugar and, hydrophilic property of the casein is significantly enhanced.

Beverage dispensing machines or visual bowls are also quite popular in modem communities so they are frequently used for dispensing various kinds of beverages in cans or even as freshly prepared fruits juices or similar beverages. When refrigerated conditions like those which should apply to "ready-to-drink" milk based beverages are necessary, this is leading to use complex and expensive techniques or machines. Further, when working with milk based beverages hygiene is a critical factor.

An approach would be to allow preparation of such acidified milk based beverages immediately before consumption, for instance by storing separately sensitive or non compatible components like e.g. milk and acid or fruit juice and then mix them on demand. This way proved in fact unduly complex and expensive and, also, not suitable for use in conventional beverage dispensing machines.

An other way to by-pass the above difficulties or drawbacks would be using stable concentrated base compositions which would simply be diluted with water on demand, i.e. just before consumption. The art, unfortunately, does not provide today any appropriate solution to the skilled artisan.

SUMMARY

The present invention offers an innovative and quite efficient solution to the skilled artisan while providing him a storable, shelf-stable, concentrated base composition which already comprises all the ingredients necessary for preparing an attractive, acidified milk based beverage by mere dilution with water, namely by dilution in a beverage dispensing or vending machine. The present invention primarily refers to a shelf-stable liquid base composition useful for preparing acidified milk based beverages, e.g. in beverage dispensers, said liquid base composition comprising:
   a. from about 2 to about 10 weight % of denatured milk proteins expressed as solid-not-fat (SNF) milk components;
   b. from about 15 to about 80 weight %, expressed as sugar equivalents, of a carbohydrate based and/or non carbohydrate based sweetener;
   c. from about 0.35 to about 1.50 weight % of a carbohydrate based stabilizer; and
   d. an acidifying agent present in amounts necessary for achieving a pH of about 3.0 to about 3.8 of the said base composition.

The invention further refers to a method for preparing the said base composition, which method comprises the sequence provided here below:
   heating a source of milk proteins at about 80 to about 120° C. over a period of about 1 to about 20 minutes to achieve denaturising of the said milk proteins;
   mixing the source of denatured milk proteins with a carbohydrate based or non carbohydrate based sweetener and with a carbohydrate based stabilizer;
   bringing the above mixture to a pH of about 3.0 to about 3.8 while mixing it with an acidifying agent; and
   sterilizing or pasteurising the above acidified mixture and subsequently pouring it into containers.

The invention also refers to another method for preparing the said liquid base composition, which method comprises the sequence provided here below:
   heating a source of milk proteins at about 80 to about 120° C. over a period of about 1 to about 20 minutes in presence of a carbohydrate based or non carbohydrate based sweetener and of a carbohydrate based stabilizer;

cooling down the heat treated mixture and bringing it to a pH of about 3.0 to about 3.8 while mixing it with an acidifying agent; and sterilizing or pasteurising the above acidified mixture and subsequently pouring it aseptically into containers.

The invention, eventually, refers to a method for preparing acidified milk based beverages by dilution of the relevant liquid base composition with an appropriate amount of water and to the beverages so afforded as well.

In the acidified milk based beverage, the dilution of the liquid base composition with an appropriate amount of water refers to diluting one part of said base composition with 2 to 7 parts or water. Dilution can occur preferably in a beverage dispensing machine under controlled dilution conditions. Controlled dilution conditions may require the use of a pump for pumping the base composition at a certain flow rate and during a controlled time and a pump for pumping the water at another flow rate and during a controlled time and mixing said base composition and water in order to obtain the desired ratio.

The acidified milk based beverage is preferably delivered with a protein content of from 0.02 to 5% SNF and with sugar equivalent of from 7 to 10 weight %. The beverage is also preferably delivered with a pH comprised between 3.6 and 4.2. A pH below 4.2 is preferred in order to guarantee a better machine hygiene. As a result of the base composition as designed, the acidified milk based beverage experiences physical stability for at least 1 hour after dispensing.

Further features or advantages of the present invention shall appear in the specification here below.

DETAILED DESCRIPTION

One of the main characteristics of the invention consists in a well adjusted balance of selected ingredients and their proportions in the base composition, more precisely the milk proteins, a first class of carbohydrates such as sugars or sugar substitutes acting as sweeteners, a second class of carbohydrates acting as stabilizers like gums, pectins or the like acting as stabilizers and acid components. This adjusted balance provides the conditions necessary for stabilizing the base composition and the "ready-to-drink" beverage as well.

The use of this base composition represents another important feature of this invention. This shelf-stable milk base is designed for application in beverage dispensers such as e.g. visual bowls and juice dispensers. In both cases, the milk base offers convenience, ease of handling over ready to drink beverages and less hygiene concerns. For machine hygiene safety, the pH of the concentrate base composition and reconstituted beverage is designed to stay below 4.2.

The specific heat treatment of selected ingredients like milk proteins represents another feature of the invention as it is leading to denaturation of milk proteins to such an extent that they remain stable when subjected to subsequent treatments like acidifying, homogenising, pasteurising or the like and filling. Surprisingly, the stability of the base composition so achieved is further reflected in the "ready-to-drink" acidified milk base beverages, which are prepared by mere dilution with an appropriate amount of water.

According to the invention the liquid base composition comprises from about 2.0 to about 10 weight %, preferably from about 3.6 to about 6.0 weight % of denatured milk protein. Within the frame of the invention, proportions of milk proteins of are preferably expressed when referring to "solid-not-fat" or "SNF" milk components although simple weight percent may also be used to that purpose. In such a case 2.0 to 10 weight % (SNF) would be equivalent to 0.7 to 3.6 g of milk proteins in 100 grams of base composition. Weight percent are expressed as referring to the total weight of the base composition, i.e. the concentrate.

Suitable sources of milk proteins subjected to denaturing within the frame of this invention are conveniently selected form fresh and powder whole or semi skimmed or fully skimmed milk. Sodium caseinate, calcium caseinate, milk protein isolates, milk protein concentrates or whey proteins can also be used.

According to the invention the milk proteins have been denatured by heat treatment. Said treatment is generally performed by subjecting a liquid source of milk proteins at temperatures comprised between about 80 to about 120° C., over a period of about 1 to 20 minutes depending on the manufacturing capabilities, preferably from 110 to 120° C. to a period of 2 to 5 minutes. The selected temperature and time conditions need to be addressed to achieve a degree of denaturation of at least 75%. The milk protein denaturing heat treatment may also be carried out as part of the processing for transforming liquid milk into heat milk powder. Therefore, high heat milk powder can be used when heat treatment has already been applied to the milk proteins to denature them. High heat milk powder refers to powder having a whey protein nitrogen index below 1.5 mg N/g. The "whey protein nitrogen index" refers to the amount of still denaturable serum protein left in the powder as described in literature, especially, in "Walstra, P., J. T. M. Wouters, T. J. Geurts, Dairy Science and Technology, Second ed, Boca Raton: CRC Taylor & Francis", page 530. A subsequent heat treatment can consequently be reduced to 85° C. for a few seconds or may even not be necessary.

The said heat treatment can be performed either in the presence of carbohydrates such as those mentioned here below, or not.

Carbohydrates are also key ingredients within the frame of the present invention; they comprise two groups each of them having a specific role to play:

a first group of carbohydrates consisting of sugars which act, mainly, as sweeteners in the "ready-to-drink" beverage. The term sugars is intended to cover ingredients such as fructose, glucose, maltose, sucrose, lactose, dextrose, high fructose corn syrup or sugar substitutes like e.g. sorbitol, mannitol, xylitol or combinations thereof. These carbohydrates also offer the advantage of reducing the water activity of the base composition and consequently, further reducing the risk of growth from bacteria, yeasts or moulds;

a second group of carbohydrates comprises polysaccharides acting as stabilizers in both the base composition and the acidified milk base "ready-to-drink" beverage. Such polysaccharides are preferably selected among gums, pectins or pectin derivatives, cellulose derivatives like sodium carboxymethylcellulose, carrageenan or carrageenan derivatives or mixtures of same. One of their main functions consists in controlling the viscosity and the stability of the base composition, especially when the latter is designed for beverage dispensing or vending machines.

Proportions of carbohydrate base sweeteners, when referred to within the frame of the invention, are preferably expressed as "sugar equivalents" although simple weight percent may also be used to that purpose. The terms "sugar equivalents" within the frame of this invention, are meant to qualify ingredients such as non-carbohydrate based, artificial, sweeteners that can replace sucrose. In terms of concentration by weight, for example a milk base containing 40% wt sucrose is equivalent in terms of sweetness to a milk base containing approximately 0.2% wt of aspartame.

Non-carbohydrate based sweeteners like e.g. Splenda®, Acesulfame K®, aspartame or Stevia® are conveniently used within the frame of the present invention. For calculation of sugar equivalents of artificial sweeteners and other carbohydrates based sweeteners, relative sweetening powders compared to sucrose, the conversion factors were taken from literature:

"Birch, G. Ingredients handbook sweeteners, Second ed. Surrey: Leatherhead Publishing" and, "Alexander, R. J. Sweeteners: nutritive, St. Paul: Eagan Press", page 40.

Sugar equivalent levels are usually comprised between about 15 to about 80 weight %, preferably between about 30 and 60 wt % and most preferably between 40 and 55%.

It has been observed that, by setting the level of sucrose between 40 and 55 weight %, good stability of the base composition could be achieved over a period running up to 12 months at 20° C.: the term "shelf-stable" or "storable" used throughout the current specification qualifies these conditions, although shorter storage periods or lower storage temperatures may be contemplated. No serum separation or precipitates were observed in the said base composition. After dilution with water, a "ready-to-drink" beverage was achieved which remained quite stable over 1 week of storage at refrigerated conditions.

When the level of sucrose was set in the range of 30 to less than 40%, good stability of the corresponding base composition was also achieved over a period running up to 6 months at ambient conditions; minor serum separation but with some sedimentation, however, have been observed in the base composition but this effect did not prevent convenient dilution of the said base with water and no specific negative effect was noticed in the "ready-to-drink" acidified beverage.

Polysaccharides stabilizers are useful for achieving the desired viscosity and density and best results have been achieved in terms of viscosity range between 15 to 250 mPa·s, preferably, between 15 to 100 mPa·s of the base composition. It has been observed that physical stability of the base composition is also closely related to the viscosity value. In particular, when viscosity of the base composition is lower than 15 mPa·s, the base composition is not stable and milk solid tends to separate from serum and to settle at the bottom of container. Phase separation raises an important issue, in particular, for delivering beverages in a beverage dispenser where no regular stirring takes place and therefore quality of the final beverage can be dramatically affected with high milk solid content variations in the final beverage.

One feature of the invention lies in selecting the most adequate polysaccharide to be used as stabilizer. It has been surprisingly observed, however, that a level and type of stabilizer that allowed having a stable base composition did not necessarily provide a stable "ready-to-drink" beverage after dilution with water.

Therefore the goal of this invention is to provide stability for both the base composition and the final beverage and, furthermore, to select a stabilizer that does not increase the viscosity of the said base too much and that, at the same time, provides an acceptable mouth feel in the final beverage. The advantage of not increasing the viscosity of the composition too much is essentially that the composition can be pumped using conventional dispenser equipment and can be diluted easily at cold or ambient temperature while providing a homogeneously mixed beverage with water as a diluent, thus allowing to use these base compositions even with very simple beverage dispensers. Further, the amount of stabilizer used is dependent on the amount of milk proteins in the base; within the frame of this invention, the most suitable proportions of the carbohydrate based stabilizers (or polysaccharides) are comprised between about 0.35 to about 1.5 weight %, preferably from about 0.50 to about 1.00 weight %.

Eventually, the choice of the stabilizer is also directed by the pH of the base composition, as the selected stabilizer needs to remain fairly active and stable at pH range below 4, preferably from 3.0 to about 3.8 during the whole processing and during storage over prolonged periods.

Among the various polysaccharides mentioned here above, i.e. gums, pectin or pectin derivatives, carrageenan or carrageenan derivatives or mixtures of same, guar gum, locust bean and sodium carboxymethylcellulose represents preferred stabilizers. When preparing a base composition having e.g. a SNF content of 3.6 weight %, of from 40 to 70 weight % of sugar equivalent concentration (which corresponds for example to 0.2 to 0.35 weight % of aspartame) and of high methyl ester pectin of about 0.4 and 0.7 weight % provide fairly stable base compositions; however, when the said base is diluted with water, solid particles tend to settle at the bottom of the container thus giving a beverage having an in-cup stability of max. 6 hours.

Best performances have been achieved by means of using high methyl ester pectin concentration ranging from 0.7 to 1 weight % and both the base composition and the final beverages exhibit the required stability and mouth feel.

Other polysaccharides such as acacia gum can be used at levels between 0.5 to 1 weight percent, proteins do not coagulate after acidification and a homogenous product was obtained.

Pectin or pectin derivatives like that mentioned above can also be combined with other hydrocolloids such as K-carrageenan, sodium carboxymethylcellulose and acacia gum: satisfying results have been obtained with both variants.

In particular, base compositions using non-sugar sweetener preferably require the use of a combination of pectin or pectin derivatives and another stabilizer having a thickening function in order to raise the viscosity of the base composition at or above 15 mPa·s. If only pectin is used, viscosity may not so be reached and a stability issue may so appear. The additional stabilizer is preferably chosen in the group of K-carrageenan, sodium carboxymethylcellulose and acacia gum, guar gum and locust bean and combinations thereof.

Fat can also be present in the mixture subject to heat treatment mentioned here above. In order to avoid fat stability in the composition by fat migrating and forming fat globules at the surface of the liquid, it is also preferred that that fat is between 0.1 to 2% weight of the base composition. By fat it is meant milk fat coming from whole or semi skimmed milk used as source of proteins or, added fat like animal or vegetable fat, when fully skimmed milk is used as source of proteins. Animal fat may comprises e.g. butter oil or gee whereas vegetal fat may comprise e.g. palm kernel, coconut, sunflower or soil oil.

Usually, fresh milk or milk powder is blended at 50° C. with water, emulsifier, sugar and melted fat if ever. Some of the sugar is used to dissolve the hydrocolloid (stabilizer) in hot water (70-80° C.) at high speed. The hydrocolloid solution is then added to the milk base and the mixture is heat treated as mentioned here above. After heat treatment, the milk and sugar concentrate is homogenized and cooled down to e.g. 4° C.

It has been observed that when working with "high heat milk powder" i.e., with whey protein nitrogen index below 1.5 mg N/g, the pre heat treatment could be reduced to 85° C. for a few seconds before cooling to 4° C. or eliminated. If using low or medium heat milk powders, the heat treatment should be adjusted accordingly. Low heat milk powder refers to powder having whey protein nitrogen index above 6 mg N/g. Medium heat milk powder refers to powder having whey nitrogen index between 1.5 and 6 mg N/g.

Another advantage of using high heat milk powder is the higher viscosity that it brings compared to low and medium heat powders.

According to the invention, dilution of the base composition with an appropriate amount of water refers to diluting one part of said base composition with 2 to 7 parts or water, e.g. in a beverage dispensing machine. Dilution of the concentrate leads to a product with pH lower than 4.2, with a sugar content of from 5 to 10 g/100 ml and milk protein content of from 0.01 to 1.8 g/100 ml.

According to the invention the mixture once subjected to the heat treatment leading to denaturation of the milk proteins is then cooled to temperature below 10° C. and subsequently brought to the convenient pH range; said pH range is a further key feature of the invention. Usually, from a mere stability point of view it is recommended to decrease the pH of the concentrate base composition to below 3.7 in order to obtain a stable isoelectric point of the milk proteins. However, such a low pH is not recommended for the consumption of a "ready-to-drink" beverage due to taste issues and most of the acidified beverages are usually consumed at a pH range of 4.0 to 4.4.

Thanks to the present invention this dilemma is conveniently solved by means of preparing a base composition the pH range of which can be lowered to an optimal level for the milk proteins, i.e. a pH of about 3.0 to about 3.5, without affecting the said milk proteins and by diluting it subsequently with the appropriate amount of water and so bringing the final beverage to pH between 3.6. and 4.2.

For applications with beverage dispensers and visual bowls, it is important that the concentrates or final beverages are kept refrigerated after opening and the pH of the product is below 4.2; therefore, below the pH range where pathogenic bacteria can grow. For best results, the pH of the concentrates is designed so that the pH of the final beverage is between 4.0 and 4.1.

Acidifying agents usable within the frame on the invention comprise edible organic acids such as e.g. citric, malic, tartaric or lactic acid. The selected acids are mixed with water in the ratio of about 30:70 and used to acidify the heated mixture of sugars, stabilizer, milk proteins and fat. Acidification is generally performed at 4° C. and by adding the above mixture to the acid solution. This type of acidification is preferred because the milk proteins pass quickly below the isoelectric point around 4.6 and then stay in a pH range of below 4.

Acidification can also be performed by means of fruit juices/concentrates like apple, pear, lemon juice, orange juices, kiwi juice or exotic fruit juices to which acid content has been adjusted accordingly. When doing so the acidification further brings selected flavor components or vitamins. Of course artificial flavor components or minerals or micronutrients can also be added to the whole mixture.

Flavors and colorants are usually added to the mixture before final heat treatment, e.g. pasteurization. Nutrients like vitamins, minerals ($Ca^{++}$ and $Mg^{++}$) etc. can be added at this stage without flavor and insolubility issues. In all cases, the dosage of these ingredients must be calculated based on the dilution factor to achieve the proper final beverages.

The base composition is heat treated to e.g. 100° C. for 10 sec using either direct or indirect method, then aseptically homogenized, cooled to 30° C. and eventually poured into suitable containers aseptically, or by clean or hot filling.

The following examples shall only illustrate some of the embodiments of the invention.

EXAMPLE 1

40 g sucrose and 45 g of partially skimmed milk were mixed at 50° C. with added hydrated solution of stabilizers such as K-carrageenan and pectin. The solution was heat treated for 2 minutes at 120° C. to denature the proteins, then homogenized and cooled down to 4° C.

The pH of the solution was quickly adjusted to 3.5 with agitation by addition of 30% citric acid solution. Colours and flavours are added at this stage. The acidified product (with viscosity of 50 mPa·s) was mixed for 30 minutes and then pasteurized and poured aseptically into storage containers.

The resulting base concentrate had 2.40% weight of SNF and 40% weight of sugar equivalent.

Such a product will be consumed after dilution of 1 part of concentrate with 4 parts of water giving acidified milk based beverage having a final pH of 4.0.

EXAMPLE 2

20 g sucrose and 45 g of partially skimmed milk were mixed at 50° C. with added hydrated solution of stabilizers such as K-carrageenan and pectin. To increase the sweetness level, 0.02 g of sucralose from Splenda® was added to the mixture. The solution was heat treated for 1 minute at 100° C., then homogenized and cooled down to 4° c.

The pH of the solution was quickly adjusted to 3.5 with agitation by addition of 30% citric acid solution. Colours and flavours are added at this stage. The acidified product (with viscosity of 45 mPa·s) was mixed for 30 minutes and then sterilized and poured aseptically into storage containers.

The resulting base concentrate had 2.40% weight of SNF and 32% weight of sugar equivalent.

A final milk based beverage having a pH of 4.0 has been obtained by dilution of 1 part of the base composition with 4 parts of water.

EXAMPLE 3

46 g sucrose and 33.4 g of fresh whole milk and 1.5 g of skimmed milk powder were mixed at 50° C. with added hydrated solution of pectin. The solution was heat-treated, then homogenized and cooled down to 20° C.

The pH of the solution quickly adjusted to 3.3 with agitation by addition of 30% citric acid solution. Colours and flavours are added at this stage. The acidified product (with viscosity of 60 mPa·s) was mixed for 30 minutes, sterilized and poured aseptically into storage containers.

The resulting base concentrate had 4.40% weight of SNF and 46% weight of sugar equivalent.

A final acidified milk based beverage is prepared by dilution of 1 part of base composition with 5 parts of water leading to final pH of 4.0.

EXAMPLE 4

28 g sucrose and 36.2 g of fresh whole milk, 2 g of "milk powder high heat" and 0.09 g of Splenda® sweetener were mixed at 50° C. with added hydrated solution of stabilizers such as 0.5% weight of CMC (Carboxymethylcellulose) and pectin 0.7 weight %. The solution was cooled down to 20° C.

The pH of the solution was quickly adjusted to 3.2 with agitation by addition of 30% malic acid solution. Colours (0.1 g) and flavours (0.35 g) are added at this stage. The product had viscosity of 100 mPa·s. The concentration of colours and flavours is 7 times higher than in a corresponding "ready-to-drink" beverage. The acidified product was mixed for 30 minutes, sterilized and aseptically filled.

The resulting base concentrate had 6.00% weight of SNF and 54% weight of sugar equivalent.

A final acidified milk based beverage is prepared by dilution of 1 part of base composition with 6 parts of water (pH 4.1).

EXAMPLE 5

0.14 grams of Splenda® sweetener and 6.1 g of "milk powder high heat" were mixed at ambient conditions with added hydrated solution of stabilizers such as pectin and carboxymethyl cellulose The solution was heat treated for few seconds at 85° C. and then cooled down to 4° C.

The pH of the solution was quickly adjusted to 3.2 with agitation by addition of 30% malic acid solution. Colours (0.1 g) and flavours (0.35 g) are added at this stage. The product had viscosity of 200 mPa·s. The acidified product was mixed for 30 minutes, pasteurised and then poured in a clean manner into storage containers.

The resulting base concentrate had 6.00% weight of SNF and 46% weight of sugar equivalent.

A final acidified milk based beverage is prepared by dilution of 1 part of base composition with 6 parts of water (pH 4.1).

The invention is claimed as follows:

1. A method of preparation of an acidified milk-based beverage, the method comprising:
    diluting, with 2 to 7 parts of water, one part of a liquid base composition comprising from about 2 to about 10 weight % of denatured milk proteins expressed as solid-not-fat (SNF) milk components; from about 15 to about 80 weight %, expressed as sugar equivalents, of a carbohydrate-based and/or non-carbohydrate-based sweetener; from about 0.35 to about 1.50 weight % of a carbohydrate-based stabilizer selected from the group consisting of gums, pectins, pectin derivatives, cellulose derivatives, carrageenan, carrageenan derivatives, and mixtures thereof so that a viscosity of the liquid base composition is between 15 and 250 mPa·s; and an acidifying agent present in an amount sufficient for achieving a pH of about 3.0 to about 3.8 of the base composition, by a beverage-dispensing machine; and
    pumping the liquid base composition by the beverage-dispensing machine using a pump.

2. The method of claim 1, wherein the acidified milk-based beverage has a protein content from 0.02 to 5% solid non-fat (SNF), sugar equivalent from 7 to 10 weight %, and a pH between 3.6 and 4.2.

3. The method of claim 1, wherein the carbohydrate-based and/or non-carbohydrate-based sweetener comprises a mono-saccharide or a second poly-saccharide selected from the group consisting of sugars, sugar substitutes, sugar derivatives, and mixtures thereof.

4. The method of claim 1, wherein the acidifying agent is selected from the group consisting of an edible acid and a source of edible acid.

5. The method of claim 1, wherein the liquid base composition further comprises a fat or a source of fat.

6. The method of claim 1, wherein the liquid base composition further comprises at least one component selected from the group consisting of flavours, colorants and micronutrients.

7. A method for preparing a shelf-stable liquid base composition, the method comprising:
    heating a source of milk proteins at about 110 to about 120° C. over a period of about 2 to about 5 minutes to denature the milk proteins;
    mixing the denatured milk proteins with a sweetener and a carbohydrate-based stabilizer to form a mixture;
    mixing the mixture with an acidifying agent to form an acidified mixture having a pH of about 3.0 to about 3.8; and
    sterilizing or pasteurizing the acidified mixture and subsequently pouring the acidified mixture into a container.

8. The method of claim 7, wherein the sweetener comprises a mono- or poly-saccharide selected from the group consisting of sugars, sugar substitutes, sugar derivatives, and mixtures thereof.

9. The method of claim 7, wherein the carbohydrate-based stabilizer comprises a polysaccharide selected from the group consisting of gums, pectins, pectin derivatives, cellulose derivatives, carrageenan, carrageenan derivatives, and mixtures thereof.

10. The method of claim 7, wherein the acidifying agent is selected from the group consisting of an edible acid and a source of edible acid.

11. The method of claim 7, wherein the source of milk proteins is subjected to the heating with a fat or a source of fat.

12. The method of claim 7, comprising adding at least one component selected from the group consisting of flavours, colorants and micronutrients to the acidified mixture prior to the sterilizing or pasteurizing.

13. A method for preparing a liquid base composition, the method comprising:
    heating a mixture comprising a source of milk proteins, a sweetener and a carbohydrate-based stabilizer at about 110 to about 120° C. over a period of about 2 to about 5 minutes to form a heat-treated mixture;
    cooling the heat-treated mixture and bringing the heat-treated mixture to a pH of about 3.0 to about 3.8 while mixing the heat-treated mixture with an acidifying agent to form an acidified mixture; and
    sterilizing or pasteurizing the acidified mixture and subsequently pouring the acidified mixture into a container.

14. The method of claim 13, wherein the sweetener comprises a mono- or poly-saccharide selected from the group consisting of sugars, sugar substitutes, sugar derivatives, and mixtures thereof.

15. The method of claim 13, wherein the carbohydrate-based stabilizer comprises a polysaccharide selected from the group consisting of gums, pectins, pectin derivatives, cellulose derivatives, carrageenan, carrageenan derivatives, and mixtures thereof.

16. The method of claim 13, wherein the acidifying agent is selected from the group consisting of an edible acid and a source of edible acid.

17. The method of claim 13, wherein the mixture subjected to the heating further comprises a fat or a source of fat.

18. The method of claim 13, comprising adding at least one component selected from the group consisting of flavours, colorants and micronutrients to the acidified mixture prior to the sterilizing or pasteurizing.

19. The method of claim 1, wherein the milk proteins in the liquid base composition have been heated at a temperature of 110 to 120° C. for a period of 2 to 5 minutes.

\* \* \* \* \*